US005114623A

United States Patent [19]

Hutson

[11] Patent Number: 5,114,623

[45] Date of Patent: May 19, 1992

[54] PROCESS FOR THE DESTRUCTION OF ALKYLPHOSPHATE

[75] Inventor: Graham V. Hutson, Gosforth, United Kingdom

[73] Assignee: British Nuclear Fuels plc, Risley, England

[21] Appl. No.: 612,469

[22] Filed: Nov. 14, 1990

[30] Foreign Application Priority Data

Nov. 14, 1989 [GB] United Kingdom ................. 8925679

[51] Int. Cl.$^5$ ........................... G21F 9/08; C02F 1/72

[52] U.S. Cl. .................................... 252/631; 210/759; 210/763

[58] Field of Search ................ 210/759, 763; 252/631; 423/10

[56] References Cited

U.S. PATENT DOCUMENTS

| | | | |
|---|---|---|---|
| 3,993,728 | 11/1976 | Schulz | 423/9 |
| 4,258,014 | 3/1981 | Pyrih et al. | 423/10 |
| 4,377,508 | 3/1983 | Rothberg | 252/631 |
| 4,394,269 | 7/1983 | Tallent et al. | 210/690 |
| 4,624,792 | 11/1986 | Yamanaka | 210/759 |
| 4,950,425 | 8/1990 | Rowbottom et al. | 252/631 |

OTHER PUBLICATIONS

Japanese Patent Gazette, week 8729, Sep. 2, 1987, Accession No. 87202132/29, Derwent Publications Ltd., London, GB; & JP-A-62129799 (Toshiba K.K.) Dec. 6, 1987.

Japanese Patent Gazette, week A38, Nov. 1, 1978, accession No. 67964A/38 Derwent Publications Ltd., London, GB; & JP-A-53 094 445 (Tokyo Org. Chem. Ind. K.K.) Aug. 18, 1978.

*Primary Examiner*—Brooks H. Hunt
*Assistant Examiner*—Ngoclan T. Mai
*Attorney, Agent, or Firm*—William R. Hinds

[57] ABSTRACT

Alkyl phosphates, which may be dissolved in a hydrocarbon solvent can be destroyed in a two-stage process, the first stage involving hydrolysis with concentrated alkali to effect partial de-alkylation of the alkyl phosphate the second stage involving catalytic oxidation of the de-alkylated phosphate with hydrogen peroxide. This results in improved safety as oxidation takes place after much of the hydrocarbon has been removed at the first stage.

29 Claims, No Drawings

PROCESS FOR THE DESTRUCTION OF ALKYLPHOSPHATE

The present invention relates to a process for the destruction of an alkylphosphate by itself or when dissolved in a hydrophobic solvent.

According to the present invention, there is provided a process for decomposing an alkylphosphate, particularly tributylphosphate, comprising a hydrolysis step of reacting the alkylphosphate by itself, or dissolved in a hydrophobic organic solvent, with an aqueous solution of an alkali metal hydroxide at an elevated temperature and a subsequent step of reacting a part or the whole of the reaction product from said first step with an aqueous solution of hydrogen peroxide in the presence of an effective amount of a transition metal catalyst.

The invention is particularly directed at the destruction of trialkylphosphates in which the alkyl groups range from ethyl to octyl, especially butyl, more especially n-butyl. The trialkylphosphates are normally dissolved in a hydrocarbon liquid, usually a mixture of hydrocarbons, for example obtained from the distillation of petroleum, typically a kerosene, boiling between 180° C. and 290° C., of which odourless kerosene is the most frequently employed.

The process of the invention may be applied to irradiated or non-irradiated solutions of alkylphosphates in hydrocarbon liquids. It is therefore particularly valuable as at least one stage in the process for treating radioactive wastes produced in the nuclear industry. Operation of the process of the invention under preferred conditions as herein described has the advantage that most of the radioactivity remains in the aqueous alkali metal hydroxide phase and separated from the phosphate and organic materials present, thus greatly simplifying and/or ameliorating the otherwise difficult and costly down-stream disposal methods.

The hydrolysis step in the process according to the invention is essentially a reaction involving the partial de-alkylation of the alkylphosphate present. In the case of the destruction of tributylphosphate, commonly used in the nuclear industry, such hydrolysis results in the formation of the alkali metal salt of dibutylphosphoric acid and butanol. Sodium hydroxide is preferred for use in the hydrolysis step, mainly for reasons of its cheapness and ready availability. In this case the partially de-alkylated tributylphosphate comprises sodium dibutylphosphate, herein abbreviated for convenience to NaDBP.

The invention, therefore, in another aspect provides a process for converting to an inorganic phosphate tributylphosphate dissolved in a hydrophobic organic solvent and having at least one radioactive species therein, the process comprising the steps of:

- a) partially de-alkylating the tributylphosphate for a period at about reflux temperature with an aqueous solution of sodium hydroxide at a concentration of at least six Molar, the period and the amount of the sodium hydroxide being such as to remove by distillation most of any butanol released in said de-alkylating step and to produce three phases, said phases comprising,
  - i) a first aqueous phase comprising sodium dibutylphosphate,
  - ii) a second aqueous phase comprising residual sodium hydroxide and containing a major proportion of the radioactive species, and
  - iii) an organic phase comprising substantially unreacted solvent,
- b) separating the first aqueous phase from the second aqueous phase and from the organic phase, and
- c) oxidising the sodium dibutylphosphate of the first phase at a temperature above 60° C. with an aqueous solution of hydrogen peroxide in the presence of an effective amount of a transition metal catalyst to form a product comprising inorganic phosphate substantially free of organic material.

The temperature at which the reaction in the hydrolysis step of the process of the invention is carried out is preferably 100° C. to 150° C., more preferably 110° C. to 140° C. conveniently at the total reflux temperature, or at distillation temperature, possibly with partial reflux.

The initial concentration of alkali metal hydroxide solution employed in the said hydrolysis step preferably lies between 6 molar and 10 molar with about 8 molar being normally used. The molar ratio of hydroxide to alkylphosphate in the initial reaction mixture preferably lies between 2:1 and 5:1 and is normally about 3:1. On a batch-wise basis, the time of reaction usually falls between 60 and 160 minutes, but the actual time can vary widely depending upon many factors such as the control of energy input and the rate of removal of the aqueous phase by distillation.

It has been found empirically that completion of the hydrolysis step can be assisted by the removal of an aqueous component of the 2-phase distillate, the volume of which is about 10% of the volume of the initial alkylphosphate/hydrocarbon mixture. This procedure also appears to assist the desired achievement of two discrete aqueous phases in the product mixture, as hereinafter described.

Alkylphosphate/hydrocarbon mixture wastes from the nuclear industry which contain significant quantities of uranium (for example 1 mg/ml of mixture) can present difficulties in the efficient operation of the process of the invention when it is desired to effect phase separation of the reaction product of the hydrolysis step of the process. Such phase separation is described hereinafter. It has been shown that the uranium may precipitate as an intractable sludge during the hydrolysis reaction. The distribution of this sludge throughout the hydrolysis reaction product can seriously interfere with effective phase separation of such product. It has been found, however, that pre-treatment of the alkyl-phosphate/hydrocarbon mixture by washing it with an alkali metal carbonate, especially sodium carbonate, solution in water preferably of molar strength 0.05 to 1.0, more preferably 0.1 to 0.25 molar at temperatures for example between about ambient and 60° C. effected the removal of uranium to such an extent that on hydrolysis of the alkylphosphate mixture no sludges are observed and efficient phase separation is possible. For this washing, it is preferred that the relative proportion of the aqueous phase containing the sodium carbonate and the hydrocarbon solvent lie between 3:1 and 1:3, especially 2:1 to 0.5:1, on a volume/volume basis. Such washing of the alkylphosphate treated in accordance with the invention, while not essential, is a preferred feature of the invention when its usefulness is indicated.

The subsequent, that is, the second, step in the process according to the invention involves the oxidation of a part or the whole of the reaction product of the first step. In the particular case in which tributylphosphate dissolved in a hydrocarbon solvent, such as kerosene, is reacted in the hydrolysis step with concentrated sodium hydroxide, the reaction product may comprise three phases as follows:

(i) an upper phase comprising hydrocarbon;

(ii) a middle aqueous phase comprising NaDBP, some sodium hydroxide and a small amount of hydrocarbon;

(iii)a lower aqueous phase comprising principally sodium hydroxide.

Such a hydrolysis step reaction product may be subjected to the subsequent step of the process according to the invention as it stands. However, for safer and more effective disposal, it is preferred to carry out separation of the various phases and components as hereinafter described.

The catalyst employed in the subsequent step of the present invention preferably comprises chromium, copper, vanadium or iron, or a mixture of two or more thereof, in particular chromium and/or copper, preferably in the form of a compound of the metal, conveniently a compound which is soluble to some extent in water. When a chromium compound is used the chromium is preferably present in its oxidation state VI. It is especially convenient to use an alkali metal chromate, such as sodium or potassium chromate.

By the term effective amount of catalyst is meant that amount which enables hydrogen peroxide to destroy at least some of the partially de-alkylated alkylphosphate. It is desirable to use at least 0.01 parts, preferably at least 0.1 parts and particularly at least 0.25 parts of catalyst the basis being weight/weight catalyst metal (for example chromium or copper metal) in the catalyst per 100 parts of partially de-alkylated alkylphosphate to be destroyed. In general it will be sufficient to use less than 8 parts by weight per 100 parts by weight of partially de-alkylated alkylphosphate and in most cases the range will lie between 0.15 and 5 parts w/w of catalyst metal and, especially in the case of chromium, 0.15 to 1 parts w/w per 100 parts of partially de-alkylated alkylphosphate.

It is important to select and maintain, as far as is practicable, preferred operating conditions in the subsequent (oxidation) step of the process. In particular, it is important to control the pH of the aqueous phase of the reaction mixture.

It is preferred to maintain the pH of the said aqueous phase at below pH 9, more preferably at between pH 6 and pH 8, most preferably at pH 6.5 to pH 7.5, in the case where chromium is present.

The reaction mixture resulting from the hydrolysis step of the process according to the invention and fed to the subsequent step will contain alkali regardless of whether such mixture is separated into its constituent phases as herein described or used as such. While this alkali might, partially at least, be neutralised by acidic species, for example phosphoric acid, produced in the subsequent (oxidation) step, it may be necessary to introduce further acidic material, conveniently phosphoric acid or nitric acid, to control the amount of alkali introduced into the liquor of the subsequent step and thereby to adjust the initial pH of the aqueous phase thereof preferably to below pH 9. It may be convenient to employ a pH buffer, for example, an alkali metal hydrogen phosphate which may be introduced into the liquor and made in situ therein. During the process of destruction of the NaDBP there is a tendency for the pH of the solution to fall as a result of the in situ generation of acid, whereas during the subsequent oxidation of the organic fragments there is a tendency for the pH of the solution to rise.

The hydrogen peroxide is introduced progressively into the liquor of the subsequent step at a rate which is related approximately to the rate of destruction of the organic species present in the liquor. By matching its rate of introduction with its rate of consumption, it is possible to prevent the build-up of hydrogen peroxide in solution, which could become unsafe. For liquors containing about 5 to 80%, preferably 10-30%, v/v NaDBP in aqueous solution, such as that separated from the reaction product of the first step, or after dilution with water for operation at 90°-100° C., it is desirable to add the hydrogen peroxide over a period of at least one hour and preferably over a period of at least 3 hours, most preferably over a period of 4 to 6 hours and normally not longer than 12 hours, although at low reaction temperatures e.g. ambient, much longer times may be required. The total amount of hydrogen peroxide which will be needed to substantially completely destroy the alkylphosphate will depend upon the nature of the alkyl groups present and the process conditions used. When the alkylphosphate to be destroyed is NaDBP, surprisingly it has been found that after the addition of about one quarter of the hydrogen peroxide theoretically required to completely oxidise the organic content of the NaDBP no NaDBP is detectable in the reaction mixture. However, a higher level of small organic fragments remains than is the case when the stoichiometric quantity of hydrogen peroxide is used. Under preferred conditions the ratio of the number of moles of hydrogen peroxide per mole of alkylphosphate may be selected from the range $2n+8$ to $2n+12$, where "n" is the number of carbon atoms in the alkyl group, for substantially complete oxidation. For most alkylphosphates the ratio will usually lie within the range 6 to 60 moles of hydrogen peroxide per mole of alkylphosphate, and when the alkylphosphate is NaDBP, preferably 6 to 36, most preferably about 24 moles of hydrogen peroxide per mole of NaDBP.

The concentration of hydrogen peroxide used is not critical, but when the aqueous volume needs to be kept as low as possible, a concentrated solution may be used consistent with the need to minimise hazards in the process. A useful range for use is 25 to 65% w/w of hydrogen peroxide in water. The peroxide may conveniently be added in the form of sodium peroxide. The peroxide may be generated in situ.

The rate of destruction of the alkylphosphate species in the liquor will generally increase as the temperature of the liquor is raised, but unless the hydrocarbon solvent is substantially removed from the liquor prior to the introduction of hydrogen peroxide there is a possibility of introducing a hazardous condition into the process if the temperature is increased above the flash point of residual solvent. Without the prior removal of solvent, the temperature may conveniently be kept at below the flash point of the hydrocarbons present. However, if the solvent has been substantially removed as is the case in most embodiments of the invention, temperatures as high as the reflux temperature of the reaction liquor (for example 101°-105° C.) may advantageously be employed or conveniently between 60° C. and 100° C.

Since the reaction product from the hydrolysis step of the process according to the invention is usually separated as herein described, the liquor fed to the oxidation step of the process is substantially a single phase mixture. Consequently the degree of agitation required during the oxidation step is not great, advantageously needing to be only sufficient to ensure adequate distribution of the hydrogen peroxide as it is added to the reaction mixture.

As hereinbefore mentioned, for efficiency and safety of destruction and eventual disposal of the waste products of the process of the invention, especially in cases where radioactive wastes are involved, it is preferred to carry out physical separation of at least some of the phases present in the reaction product of the first step of the process according to the invention, involving hydrolysis of the alkyl phosphate. For convenience, the preferred steps of separation will be described in relation to the application of the invention to the destruction of tributylphosphate dissolved in odourless kerosene produced as a waste product of the nuclear industry.

In preferred embodiments, it is desirable to remove by distillation the butanol and some of the water from the reaction mixture during the hydrolysis step. This yields an immiscible two-phase distillate of water and kerosene with each phase containing dissolved butanol. The water can readily be separated off and the organic material safely disposed of by incineration, conveniently together with the kerosene separated from the 3-phase residue of the distillation as hereinafter described.

The residue of the distillation comprises a three phase mixture comprising residual sodium hydroxide, NaDBP and kerosene depleted of tributylphosphate. From this mixture, aqueous sodium hydroxide may be physically separated after the phases have settled out. This liquor contains the major part of the radioactivity and can be disposed of by means of conventional methods available in the nuclear industry.

The kerosene phase may be separated physically from the mixture and conveniently disposed of by incineration.

The remaining phase which comprises NaDBP may be diluted with water to reduce the proportional amount of kerosene present to more acceptable levels and used as the feedstock to the subsequent oxidation step described hereinbefore.

Thus the invention in a further aspect provides a process for converting to an inorganic phosphate tributylphosphate in a solution comprising about 20% by volume of said tributylphosphate in odourless kerosene and having one or more radioactive species including uranium therein, the process comprising the steps of:

a) washing the solution with aqueous sodium carbonate at a molar strength between 0.1 and 0.25 to remove at least some of said uranium,
b) partially de-alkylating the washed solution by heating the washed solution for about 30 minutes to reflux temperature with aqueous sodium hydroxide at a molar strength of about 8, maintaining the reflux temperature for about 100 minutes, then reducing the temperature to about 60° C., sufficient sodium hydroxide being present to produce three phases, the phases comprising,
   i) an aqueous sodium hydroxide phase containing a major proportion of the remaining radioactive species, said sodium hydroxide phase being removed at said 60° C. temperature,
   ii) an aqueous phase comprising sodium dibutylphosphate, and
   iii) an organic phase comprising said odourless kerosene, and diluting with water the aqueous sodium dibutylphosphate phase and the organic phase and allowing them to cool to ambient temperature, and separating the organic phase from the aqueous sodium dibutylphosphate phase, and
c) oxidising the diluted aqueous sodium dibutylphosphate phase by adding potassium chromate thereto and adjusting the pH to about 7 with phosphoric acid, and adding aqueous hydrogen peroxide at about 50% weight/weight at a steady rate for about six hours and at reflux temperature while maintaining the pH at 6.5 to 7.5 by the addition of sodium hydroxide or nitric acid, thereby to form a product comprising inorganic phosphate substantially free of organophosphates and organic material.

The invention has the advantage, in addition to any hereinbefore mentioned, that the oxidation step, being a single-phase reaction, is very efficient as indicated by the small amount of free oxygen produced. This, when carried out with the virtual absence of potentially inflammable kerosene, means that safety problems are very considerably reduced.

The invention is illustrated by, but not limited, to the following Examples.

EXAMPLE 1

A glass vessel equipped with means for agitation was charged with 100 ml of waste solvent from a metal nuclear fuel reprocessing plant. This waste solvent contained approximately 20% by volume of Tributylphosphate (TBP) in odourless kerosene (OK). 200 ml of 0.1 molar aqueous solution of sodium carbonate was added, and the resulting mixture was stirred at ambient temperature for 30 minutes. The contents of the vessel were then allowed to settle for 30 minutes, and the two phases obtained were separated by physical means. A virtually unchanged volume of TBP/OK mixture was recovered, i.e. about 100 ml. The activities and amounts, where appropriate, of the major radioactive contaminants and uranium present in the TBP/OK mixture before and after this washing treatment were as follows:

| | Before | After |
|---|---|---|
| alpha activity | $6.4 \times 10^6$ Bq/l | $1.9 \times 10^6$ Bq/l |
| plutonium | $1.7 \times 10^{-3}$ g/l | $0.5 \times 10^{-3}$ g/l |
| uranium | 1.1 g/l | $<1 \times 10^{-2}$ g/l |
| ruthenium-106 activity | $7.2 \times 10^7$ Bq/l | $3.7 \times 10^7$ Bq/l |
| iodine-129 activity | $3.2 \times 10^5$ Bq/l | $2.6 \times 10^5$ Bq/l |

A reactor fitted with an agitator and a reflux condenser was charged with the washed TBP/OK obtained (100 ml of approximately 20% by volume of TBP in OK). To this was added 30 ml of 8 molar aqueous NaOH and, while this reaction mixture was stirred, its temperature was raised to the boiling point in approximately 30 minutes. About 10 ml of an aqueous phase was then distilled off over approximately 100 minutes. Agitation was then stopped and the mixture allowed to cool to 60° C. The lower aqueous NaOH phase was removed, which comprised 10 ml of approximately 10 molar NaOH containing in excess of 90% of the alpha-activity and the ruthenium-106 activity, and about 65% of the iodine-129 activity. 50 ml of water was added to the NaDBP and organic phases remaining in the reactor, which was then stirred for a few moments prior to being left to cool to ambient temperature, and then separated. The NaDBP phase amounted to 75 ml of 0.9 molar NaDBP containing approximately 1.5% of the alpha activity, 6% of the ruthenium-106 activity and 15% of the iodine-129 activity. The OK phase amounted to 68 ml and contained insignificant alpha activity, about 0.1% ruthenium-106 activity and 20% of iodine-129 activity.

47 ml of the NaDBP phase was made up to 50 ml with water to give a 0.8 molar NaDBP solution. 0.21 g of potassium chromate was added, the pH of the solution was adjusted to 7 with phosphoric acid, and the mixture heated, with stirring, to boiling (approximately 101° C.). 68.4 g of 50% w/w hydrogen peroxide solution in water, was added at a steady rate over 6 hours with the reaction being maintained under total reflux. The pH was maintained at 7 by the addition of NaOH or $HNO_3$ as required. After some 1½ hours the NaDBP content of the mixture was substantially zero, and after 6 hours the total organic carbon remaining in solution was less then 1% of the initial organic material present.

EXAMPLE 2

Similar apparatus was used in this example as in Example 1, except that the vessel etc capacities were proportionately larger to accommodate the larger volumes of liquors used.

One liter of waste solvent from a metal nuclear fuel reprocessing plant comprising approximately 20% by volume of TBP in OK was agitated for 30 minutes with 800 ml of 0.25 molar aqueous sodium carbonate and the phases separated. Major radioactive contaminants and uranium in the organic phase were reduced in a similar way to that shown in Example 1.

One liter of the washed waste solvent produced was treated with 290 ml of 7.5 molar aqueous NaOH by being brought to the boiling point in 40 minutes and then 100 ml of aqueous phase together with some OK distilled off over a period of 140 minutes. The resulting products were separated in a similar amount to that described in Example 1 except that 500 ml of water was added to the mixture of OK and NaDBP phases prior to their separation. The compositions of the separated phases was substantially similar to those shown in Example 1.

470 ml of separated NaDBP phase was further diluted to 500 ml in an agitated vessel. 2.7 g of cupric nitrate trihydrate was added as catalyst and the stirred mixture heated to reflux temperature. 684 g of a 50% w/w solution of aqueous hydrogen peroxide was added at constant rate over 6 hours, during which the pH was maintained at not less than 6.5 by the addition of NaOH. After 3 hours the concentration of NaDBP had been reduced to substantially zero, and, on completion of the reaction, about 12% of the total organic carbon remained in solution.

EXAMPLE 3

In this Example waste solvent from the first cycle of an oxide nuclear fuel reprocessing plant was treated. Compared with the metal fuel reprocessing plant material used in Examples 1 and 2, this starting material contains relatively little activity and uranium (e.g. 50 Bq/l ruthenium-106 and 0.4 g/l uranium). Therefore, pre-washing with sodium carbonate is not necessary. It was therefore subjected to the first step hydrolysis stage as described in Example 1 using 40 ml of 7.5 molar NaOH solution and the lower NaOH aqueous phase separated at the end of the reaction.

47 ml of the NaDBP phase separated from the hydrolysis step was diluted to 100 ml with water to give a 0.42 molar NaDBP solution. 0.21 grams of potassium chromate was added and the reaction mixture brought to 60° C. while being stirred. While the reaction was maintained at this temperature for 4 hours, a total of 68.4 grams of 50% w/w aqueous hydrogen peroxide was added at a steady rate while maintaining the pH at 6.5 to 7.5. On completion of the reaction the total organic phosphate content was less than 0.2% by weight.

EXAMPLE 4

One liter of waste solvent from a metal nuclear fuel reprocessing plant which had been washed with sodium carbonate as in Example 2 was treated by hydrolysis as in Example 2 except that, upon reaching the boiling point, the reaction mixture was kept at total reflux conditions for 240 minutes, and 100 ml of the aqueous phase was then distilled off over 60 minutes. The phases were separated in a similar manner to that described in Example 2 and found to have similar compositions.

The diluted NaDBP phase of about 725 ml was further diluted to 1100 ml with water and 4.6 grams of potassium chromate added. This mixture was brought to reflux with stirring and 1200 grams of 50% w/w aqueous hydrogen peroxide added at a constant rate over 6 hours, with the temperature being maintained at reflux and the pH kept at 7 by the addition of NaOH or $HNO_3$ as appropriate. At the end of the reaction, no organophosphate was detectable in the mixture and the total organic carbon was less than 1% of the initial organic material present.

EXAMPLE 5

A reactor fitted with an agitator was charged with 200 liters (150 kg) of odourless kerosene (OK) and 50 liters (48.6 kg) of tributylphosphate (TBP). 73 liters (91.7 kg) of 7.5 molar aqueous sodium hydroxide was then added to the reactor. The stirred mixture was raised to boiling point in about 40 minutes, from which time some 25 liters of an aqueous phase together with OK was distilled off over a period of 140 minutes i.e. at a distillation rate of about 0.18 liters per minute. Agitation was stopped and the mixture allowed to cool to 60° C. over 30 minutes. The lower aqueous NaOH phase was removed and 170 liters of water added to the remaining NaDBP and OK phases. This new mixture was agitated for 15 minutes, then allowed to settle for 30 minutes at ambient temperatures. The diluted aqueous NaDBP was then separated from the OK.

The separated NaDBP phase contained less than 0.5% by weight of OK and the OK phase contained less than 0.1% by weight of organophosphate.

The approximate 180 liters of the NaDBP phase recovered was diluted to 270 liters by the addition of water, and 1.05 kg of potassium chromate added. The mixture was heated to reflux and 295 kg of 50% w/w aqueous hydrogen peroxide added in the same way and under the same conditions as described in Example 4, with essentially similar results.

EXAMPLE 6

A second reaction was carried out essentially the same as that shown in Example 5 except that the reactor was charged with 175 liters (138 kg) of OK and 75 liters (72.9 kg) of TBP (i.e. 30% TBP/OK by volume) to which was added 110 liters (138 kg) of 7.5 molar aqueous NaOH. The reaction was carried out in a manner similar to that described in Example 1 until the NaOH phase had been removed at the end of the hydrolysis reaction. 180 liters of water was then added to the remaining OK and NaDBP phases, the mixture agitated and separated as in Example 1, the separated phases having compositions similar to those shown in Example 5.

In this Example the NaDBP phase consisted of approximately 270 liters which was further diluted to 405 liters with water and 1.725 kg of potassium chromate added. The mixture was treated with 450 kg of 50% w/w hydrogen peroxide as described in Example 5 and similar results were obtained.

I claim:

1. A process for converting to an inorganic phosphate a trialkylphosphate having an alkyl group in the range ethyl to octyl, the process comprising the steps of:

a) partially de-alkylating the trialkylphosphate for a period at about reflux temperature with an aqueous solution of an alkali metal hydroxide at a concentration of at least six Molar, the period and the amount of the hydroxide being such as to remove by distillation most of any volatile organic material released and to produce two aqueous phases, a first aqueous phase comprising alkali metal of the partially de-alkylated said trialkylphosphate, and a second aqueous phase comprising residual of said hydroxide;

b) separating the first aqueous phase from the second aqueous phase, and c) oxidising the separated first aqueous phase with an aqueous solution of hydrogen peroxide at an elevated temperature and in the presence of an effective amount of a transition metal catalyst to produce inorganic phosphate substantially free of organic material.

2. The process as claimed in claim 1, wherein the trialkylphosphate is tributylphosphate.

3. The process as claimed in claim 1 wherein the alkali metal hydroxide is sodium hydroxide.

4. The process as claimed in claim 1 wherein the reflux temperature is between 100° C. and 150° C.

5. The process as claimed in claim 1 wherein the molar ratio of hydroxide to trialkylphosphate initially lies between 2:1 and 5:1.

6. The process as claimed in claim 1 wherein the metal catalyst is selected from the group consisting o chromium, copper, vanadium and iron.

7. The process as claimed in claim 1 wherein the amount of catalyst employed, based on its metal content, is between 0.15 and 5.0 parts per 100 parts of the partially dealkylated trialkylphosphate on a weight/weight basis.

8. The process as claimed in claim 1 wherein the pH of the first aqueous phase in the oxidising step is maintained below 9.

9. The process as claimed in claim 1 wherein the amount of hydrogen peroxide introduced is in the range from 6 to 60 moles per mole of the partially dealkylated trialkylphosphate.

10. The process as claimed in claim 1 wherein any organic solvent is substantially removed prior to the introduction of hydrogen peroxide in the oxidising of the partially de-alkylated trialkylphosphate.

11. The process as claimed in claim 10 wherein the oxidising step is carried out at a temperature between 60° C. and 100° C.

12. The process as claimed in claim 1 wherein the trialkylphosphate contains significant quantities of uranium and is washed prior to the partially dealkylating step with an alkali metal carbonate solution in water.

13. The process as claimed in claim 1, wherein the concentration of the alkali metal hydroxide solution lies between 6 and 10 Molar.

14. A process for converting to an inorganic phosphate tributylphosphate dissolved in a hydrophobic organic solvent and having at least one radioactive species therein, the process comprising the steps of:

a) partially de-alkylating the tributylphosphate for a period at about reflux temperature with an aqueous solution of sodium hydroxide at a concentration of at least six Molar, the period and the amount of the sodium hydroxide being such as to remove by distillation most of any butanol released in said dealkylating step and to produce three phases, said phases comprising, i) a first aqueous phase comprising soidum dibutylphosphate, ii) a second aqueous phase comprising residual sodium hydroxide and containing a major proportion of the radioactive species, and iii) an organic phase comprising substantially unreacted solvent, b) separating the first aqueous phase from the second aqueous phase and from the organic phase, and c) oxidising the sodium dibutylphosphate of the first phase at a temperature above 60° C. with an aqueous solution of hydrogen peroxide in the presence of an effective amount of a transition metal catalyst to form a product comprising inorganic phosphate substantially free of organic material.

15. The process as claimed in claim 14, wherein the hydrophobic organic solvent comprises odourless kerosene.

16. The process as claimed in claim 14, wherein the reflux temperature is between 100° C. and 150° C.

17. The process as claimed in claim 14, wherein the molar ratio of the sodium hydroxide to the tributylphosphate initially lies between 2:1 and 5:1.

18. The process as claimed in claim 14, wherein the sodium hydroxide solution has a concentration between 6 Molar and 10 Molar.

19. The process as claimed in claim 14, wherein the metal catalyst is selected from the group consisting of: chromium, copper, vanadium and iron.

20. The process as claimed in claim 19, wherein the amount of the metal catalyst based on its metal content is between 0.15 and 5.0 parts per 100 parts of dibutlyphosphate of the first phase tributylphosphate on a weight/weight basis.

21. The process as claimed in claim 14, wherein the period includes a time during which the partially dealkylated tributylphosphate and the residual sodium hydroxide solutions are allowed to cool to about 60° C., the second aqueous phase then being separated from the first aqueous phase and the organic phase.

22. The process as claimed in claim 21, including subsequently diluting with water the first aqueous phase and the organic phase, agitating the diluted phases, and allowing the agitated phases to settle at ambient temperatures, the first aqueous phase and the organic phase then being separated.

23. The process as claimed in claim 14, wherein the pH of the aqueous phase in the oxidising step is maintained below pH9.

24. The process as claimed in claim 14, wherein the amount of hydrogen peroxide introduced in the oxidising step is in the range from 6 to 60 moles per mole of partially dealkylated tributylphosphate.

25. The process as claimed in claim 14, wherein the concentration of the hydrogen peroxide solution introduced in the oxidising step is in the range from 25 to 65% on the weight/weight basis.

26. A process as claimed in claim 14, wherein the oxidising step is carried out at a temperature between 60° C. and 100° C.

27. A process as claimed in claim 14, and further comprising a pre-treatment step before the partially dealkylating step, said pre-treatment step comprising washing the solution with an alkali metal carbonate solution in water.

28. A process as claimed in claim 27, wherein the alkali metal carbonate solution comprises sodium carbonate at a molar strength between 0.05 and 1.0.

29. A process for converting to an inorganic phosphate tributylphosphate in a solution comprising about 20% by volume of said tributylphosphate in odourless kerosene and having one or more radioactive species including uranium therein, the process comprising the steps of:

a) washing the solution with aqueous sodium carbonate at a molar strength between 0.1 and 0.25 to remove at least some of said uranium, b) partially de-alkylating the washed solution by heating the washed solution for about 30 minutes to reflux temperature with aqueous sodium hydroxide at a molar strength of about 8, maintaining the reflux temperature for about 100 minutes, then reducing the temperature to about 60° C., sufficient sodium hydroxide being present to produce three phases, the phases comprising, i) an aqueous sodium hydroxide phase containing a major proportion of the remaining radioactive species, said sodium hydroxide phase being removed at said 60° C. temperature, ii) an aqueous phase comprising sodium dibutylphosphate, and iii) an organic phase comprising said odourless kerosene, and diluting with water the aqueous sodium dibutylphosphate phase and the organic phase and allowing them to cool to ambient temperature, and separating the organic phase from the aqueous sodium dibutylphosphate phase, and c) oxidising the diluted aqueous sodium dibutylphosphate phase by adding potassium chromate thereto and adjusting the pH to about 7 with phosphoric acid, and adding aqueous hydrogen peroxide at about 50% weight/weight at a steady rate for about six hours and at reflux temperature while maintaining the pH at 6.5 to 7.5 by the addition of sodium hydroxide or nitric acid, thereby to form a product comprising inorganic phosphate substantially free of organophosphates and organic material.

* * * * *